United States Patent [19]

Murray

[11] 3,768,194
[45] Oct. 30, 1973

[54] WEEDLESS BASKET PLUG
[76] Inventor: Harry E. Murray, 412 East Pierce, Kirksville, Mo.
[22] Filed: Oct. 10, 1972
[21] Appl. No.: 295,850

[52] U.S. Cl. .................................. 43/42.1, 43/42.4
[51] Int. Cl. ............................................ A01k 85/00
[58] Field of Search ............................ 43/42.1, 42.4

[56] References Cited
UNITED STATES PATENTS
1,178,861  4/1916  Kruschke ............................ 43/42.4
3,170,756  2/1965  Butler ............................... 43/42.1 X
2,214,360  9/1940  Woodley ............................. 43/42.1

Primary Examiner—Louis G. Mancene
Assistant Examiner—J. Q. Lever
Attorney—D. Paul Weaver et al.

[57] ABSTRACT

A weedless basket plug formed of a flexible ribbed basket, sets of hooks spacedly mounted to a rod located inwardly of the basket, and an inwardly and forwardly directed flexible shield associated with each set of hooks that is secured at its outer rear end to the basket and whose inner forward end is movably mounted to the rod.

4 Claims, 4 Drawing Figures

PATENTED OCT 30 1973　　　3,768,194

WEEDLESS BASKET PLUG

BACKGROUND OF THE INVENTION

While fish lures that are designed so that their hooks will not snag on obstacles such as weeds are well known, as exemplified by U.S. Pat. Nos. 2,589,435, 3,170,766, and 3,214,360, such lures still do not ensure that they will not snag on the obstacles and will, nevertheless, have their hooks impaled in the fish's mouth in response to the striking at the lure by the fish.

SUMMARY OF THE INVENTION

This invention provides a solution to the aforementioned problem by so constructing the lure, in the form of a weedless basket plug, that a shield shields the hooks from obstacles while the lure is being trailed through the water and the shield is moved out of shielding position when the fish strikes at the lure. This is accomplished by incorporating in the weedless basket plug a flexible ribbed cage that is located outwardly of a hook that is mounted to a rod located inwardly of the cage. An inwardly and forwardly directed flexible shield, interposed between the cage and the rod, extends outwardly of the hook. The outer rear end of the shield is secured to the cage, and the inner forward end of the shield is movable with respect to the rod. This construction enables an inward squeezing of a portion of the cage by the fish's mouth to move the squeezed portion of the cage, together with the shield, forwardly and inwardly to thereby project the hook outwardly of the cage into the fish's mouth.

DESCRIPTION OF THE PREFERRED EMBODIMENT

Figure 1:
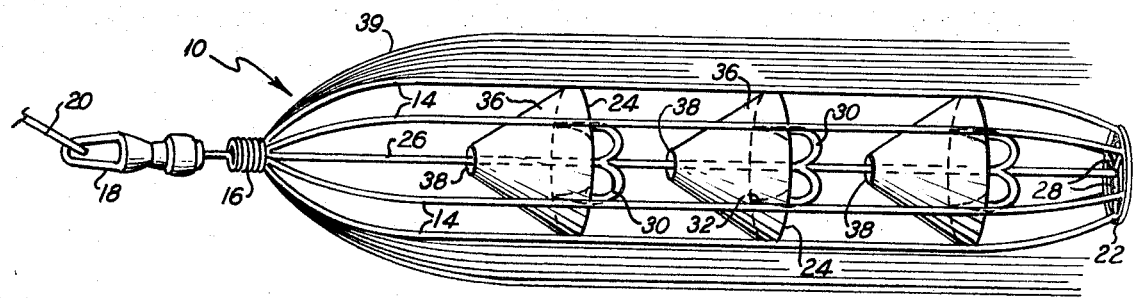
FIG. 1 is an isometric view of the weedless basket plug.

Referring to FIG. 1, the weedless basket plug 10 includes an elongated basket 12 made of flexible plastic. The basket 12 includes a plurality of spaced longitudinal ribs 14 formed in a circular pattern that converge forwardly onto a sleeve 16 of a barrel swivel 18 to which a line 20 is secured. The back of the ribs 14 are integrally secured to an annular flexible back rib 22. Three annular intermediate flexible ribs 24 are integrally secured to the longitudinal ribs 14 between the front and back ends of the ribs 14.

A shaft 26, extending longitudinally through the basket 12 along its axis, is secured at its front to the sleeve 16 and at its rear to radial ribs 28 that are integrally connected to the back rib 22. Three sets of hooks 30 are mounted at spaced intervals along the shaft 26. The hooks 30 have forwardly directed barbs 22.

A shield 34 is associated with each set of hooks 30. Each shield is formed of a flexible plastic cone 36 that is integral with an annular intermediate rib 24 and extends forwardly and inwardly of its associated rib 24 to a front end 38 that extends about the shaft 26 so as to provide clearance between the front ends 38 and the shaft 26 which enables the cones 36 to move forwardly relative to the shaft 26 as described below.

A skirt 39 of plastic filaments is secured to the sleeve 16 and extends rearwardly thereof about the basket 12.

In the use of the basket plug 10, it is led forwardly through the water by the line 20 with the basket longitudinal ribs 14 held outwardly of the hooks 30 in the FIG. 1 position by the shields 34 so that the hooks will not snag on weeds. This shielding effect of the shields 34 is enhanced by the fact that the shields lie forwardly of the hook barbs 32 and partially enclose and extend outwardly of the hooks. The skirt 39, while also shielding the hooks 30 to some extent, serves to hide the basket 12 and the hooks 30 from a fish.

Figure 2:
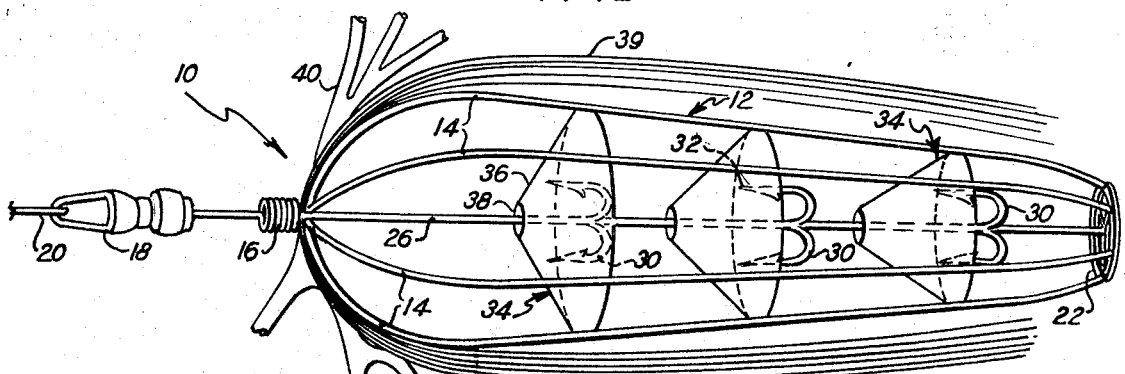
FIG. 2 is a view of the basket plug as it engages an obstacle in the water.

Should the basket plug 10, during its forward movement through the water, become snarled on an underwater obstacle 40 (see FIG. 2), the flexible basket 12 will tend to enlarge diametrically which causes the shields 34 to enlarge diametrically with the cone front ends 38 moving rearwardly with respect to the shaft 26 to thereby enhance the shielding effect of the shields 34 with respect to the hooks 30.

Figure 3:
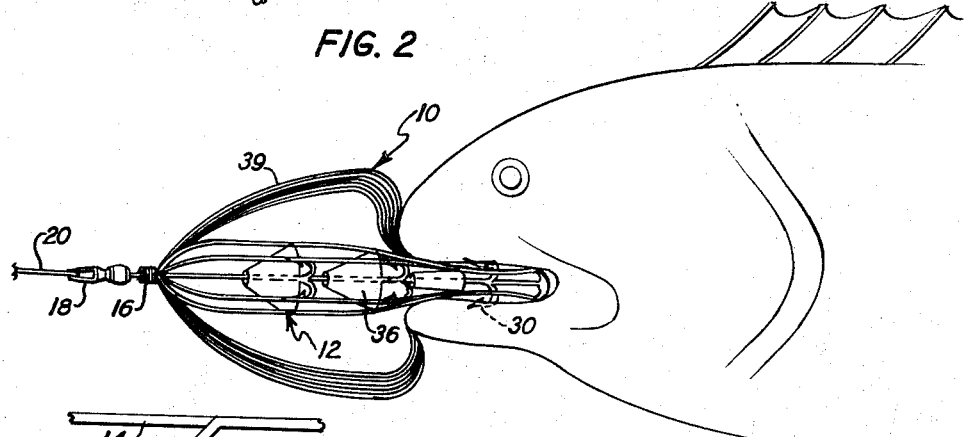
FIG. 3 is a view of the basket plug as it is being struck at by a fish.

Referring to FIG. 3, when a fish strikes at the basket plug 12, his mouth squeezes the basket to force those portions of the longitudinal ribs 14 and those annular ribs 24 engaged by the mouth inwardly. Due to the forward and inwardly inclination of the shields 34, those shields whose ribs 24 are squeezed inwardly will move forwardly of the shaft 26 with the associated cone front end 38 moving forwardly of the shaft 26 to thus expose the associated hooks so that they project radially outwardly of the basket 12, rearwardly of its associated shield 34, and become impaled iwth the fish's mouth.

Figure 4:
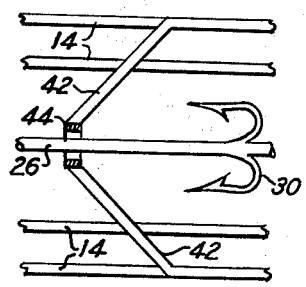
FIG. 4 is a view of a part of a modification of the weedless basket plug.

FIG. 4 shows an alternative basket construction wherein braces 42, which are substituted for the shields 34, extend inwardly and forwardly of the longitudinal ribs 14, the rear ends of the braces being located outwardly of each set of hooks 30. The front ends of the braces 42 are secured to a collar 44 that is movably mounted on the shaft 26. When the fish's mouth squeezes the ribs 14 inwardly, the braces 42, which function as a shield for the hook set 30, are forced forwardly and inwardly with the collar 44 moving forwardly along the shaft 26, to expose the hook set 30 to the fish's mouth.

I claim:

1. A weedless basket plug comprising: a longitudinally extending basket formed of flexible spaced ribs converging at a front of the basket, the basket having an axis; a longitudinally extending rod located along the axis of the basket; a hook, mounted to the rod and located within the basket; and a flexible shield secured at its outer rear end to the basket, and having an inner forward end located inwardly of the ribs toward the longitudinally extending rod and forwardly toward the front of the basket, the inner forward end of the shield being movable with respect to the rod, the outer rear end of the shield extending outwardly of the hook with respect to the axis of the basket so as to shield the hook; whereby an inward squeezing of a portion of the basket by a fish's mouth causes the shield, together with the squeezed basket portion, to move forwardly and inwardly to thereby project the hook outwardly of the ribs into the fish's mouth.

2. The basket plug of claim 1 wherein said basket further comprises: an annular rib extending about the rod; and wherein said shield comprises: a forwardly and inwardly directed cone that is secured at its outer, rear end to the annular rib.

3. The basket plug of claim 1 wherein said shield comprises: at least one forwardly and inwardly directed brace that is secured at its outer rear end to a rib; and a collar, secured to the inner front end of the brace, that is movably mounted on the rod.

4. The basket plug of claim 1 further comprising: a skirt of filaments extending outwardly of the basket.

* * * * *